United States Patent Office 3,283,453
Patented Nov. 8, 1966

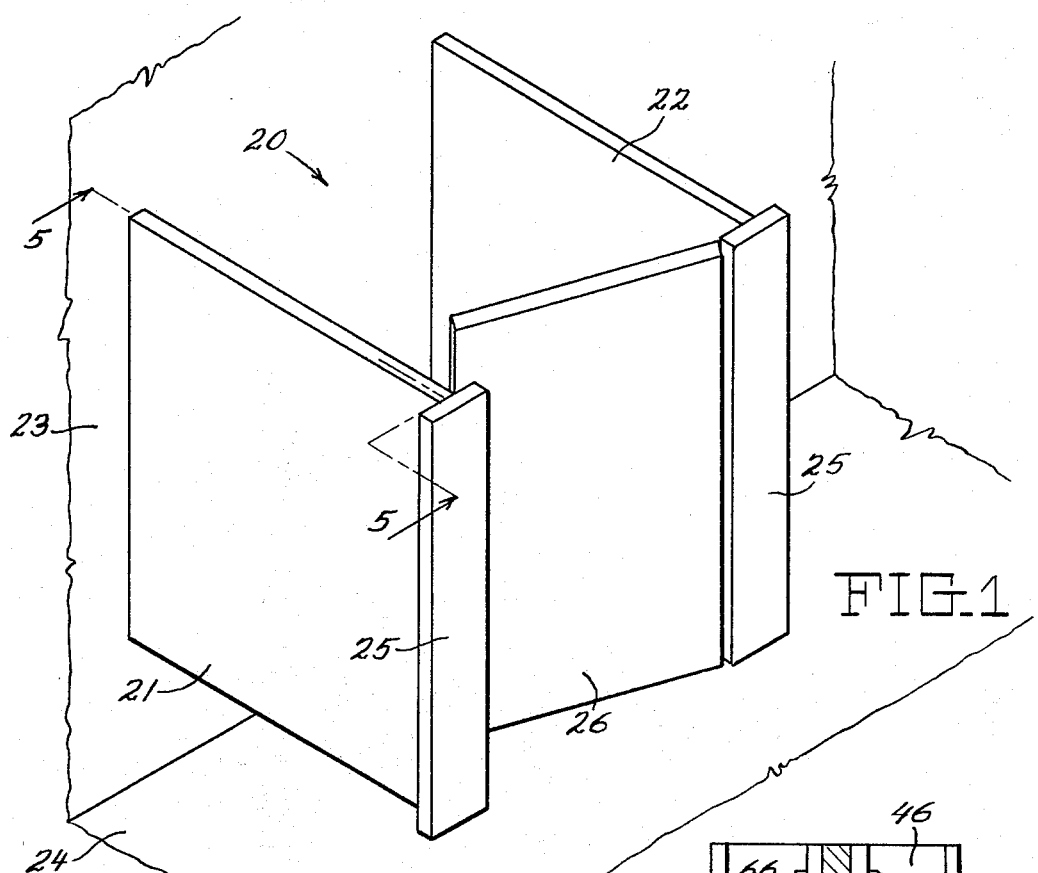
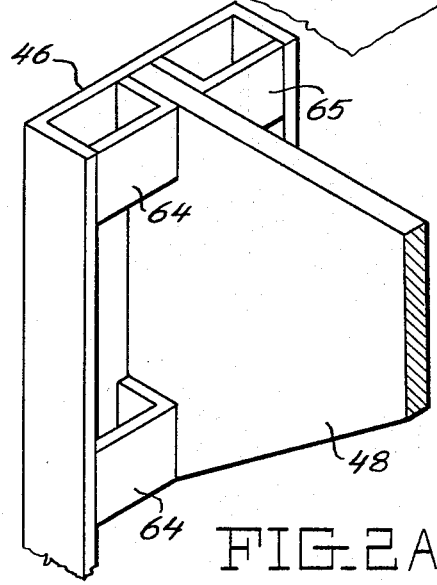
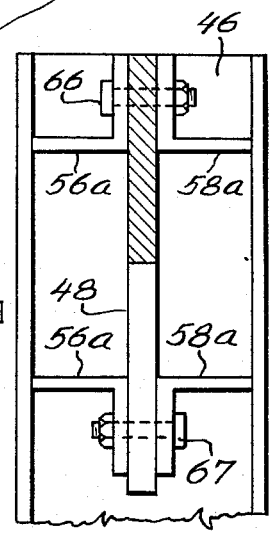

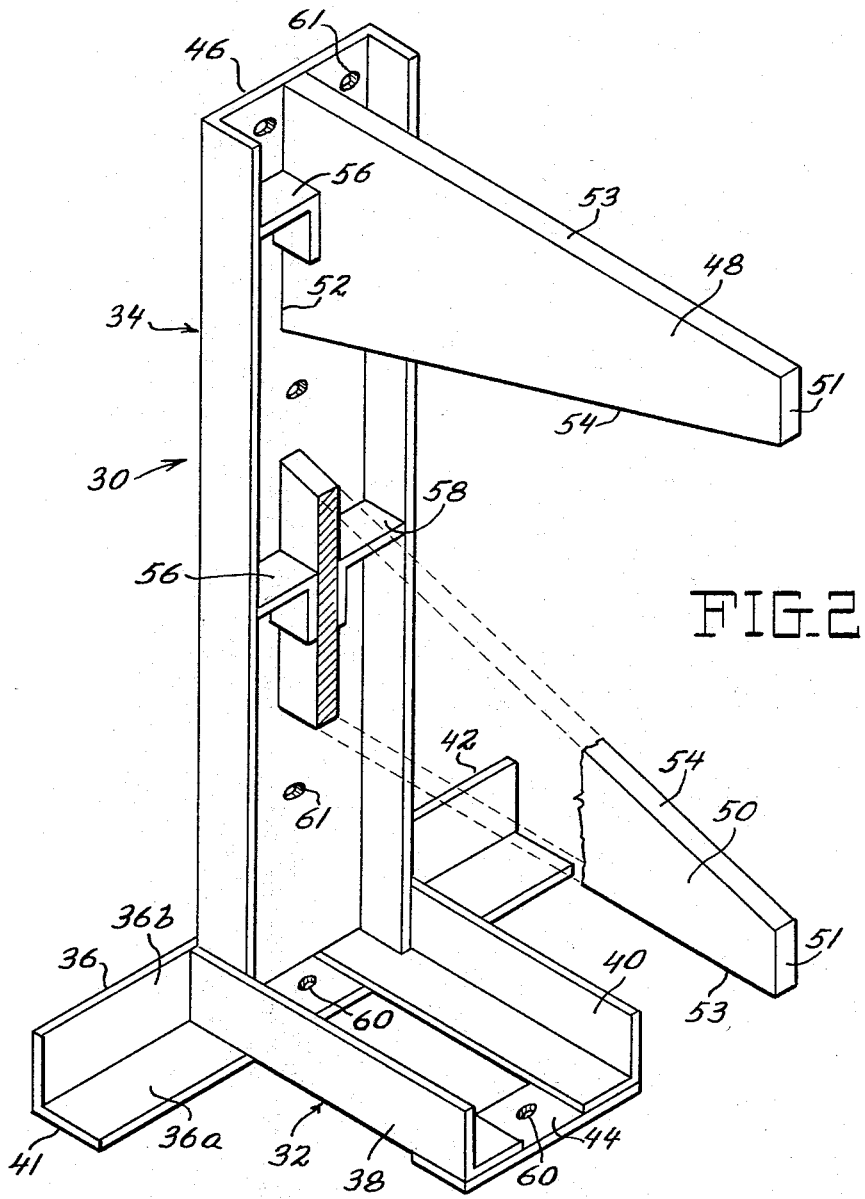

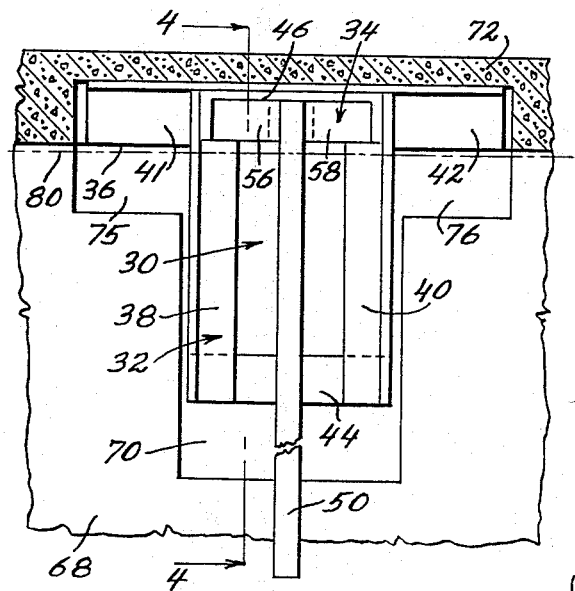
FIG_3
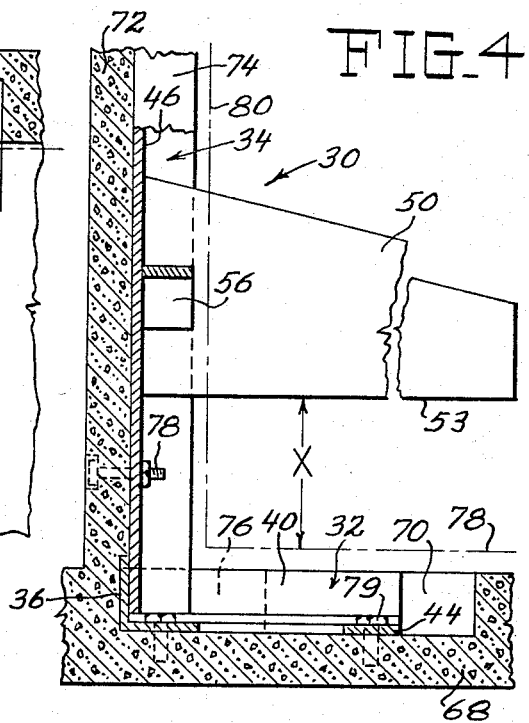
FIG_4
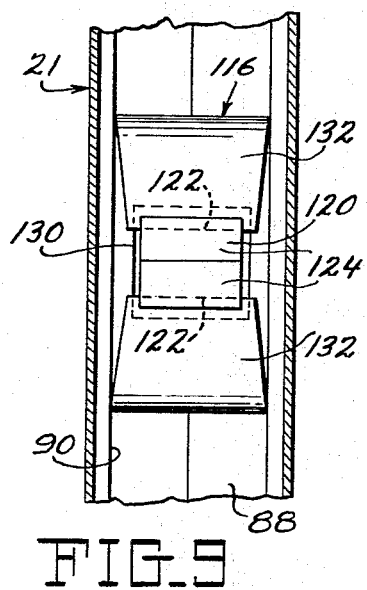
FIG_5
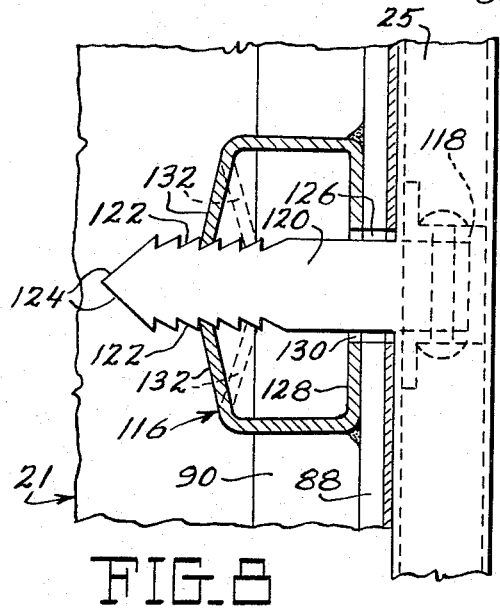
FIG_6
INVENTOR
Nathan Schooler
BY A. Joseph Goldberg
ATTORNEY

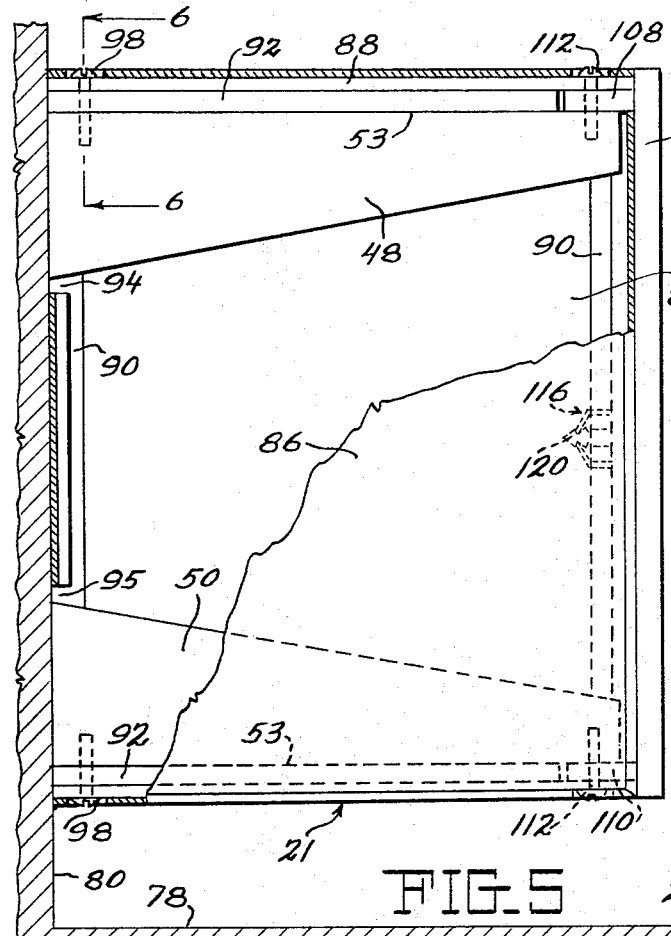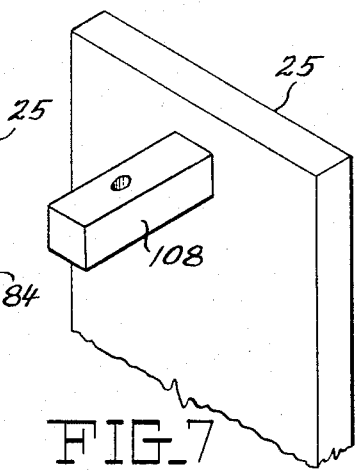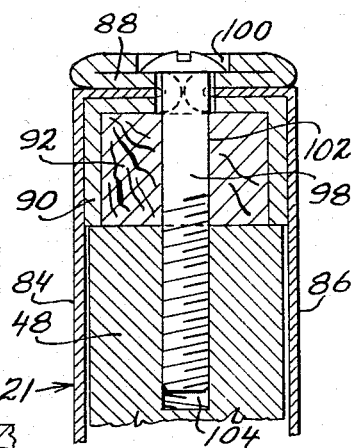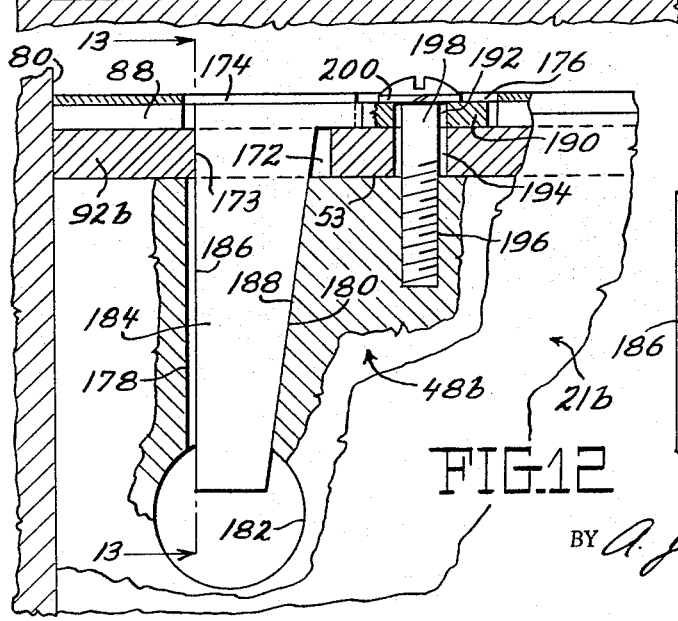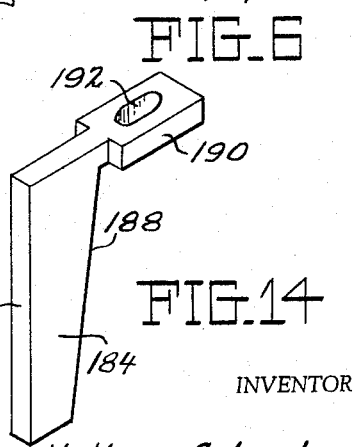

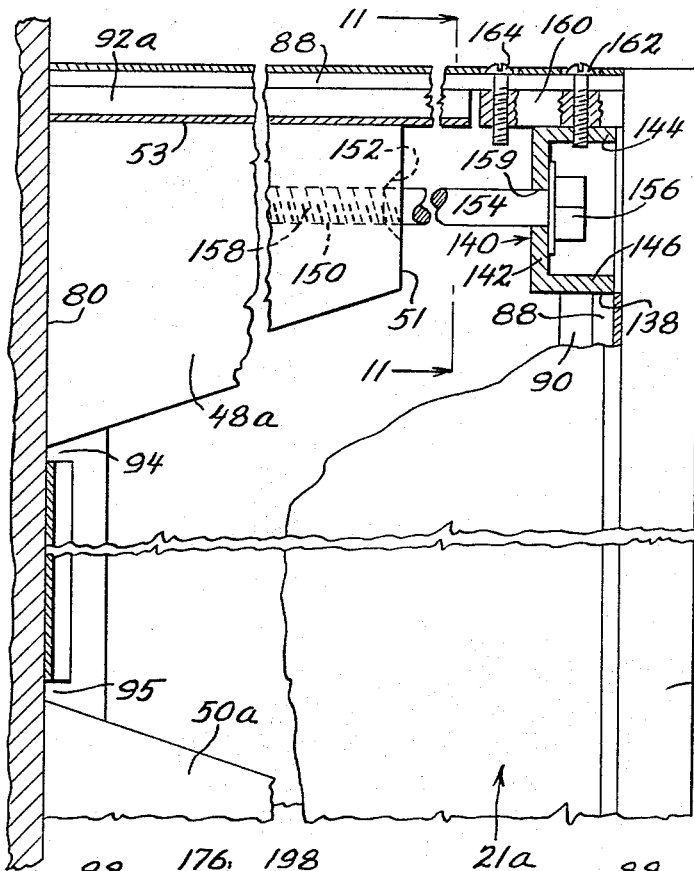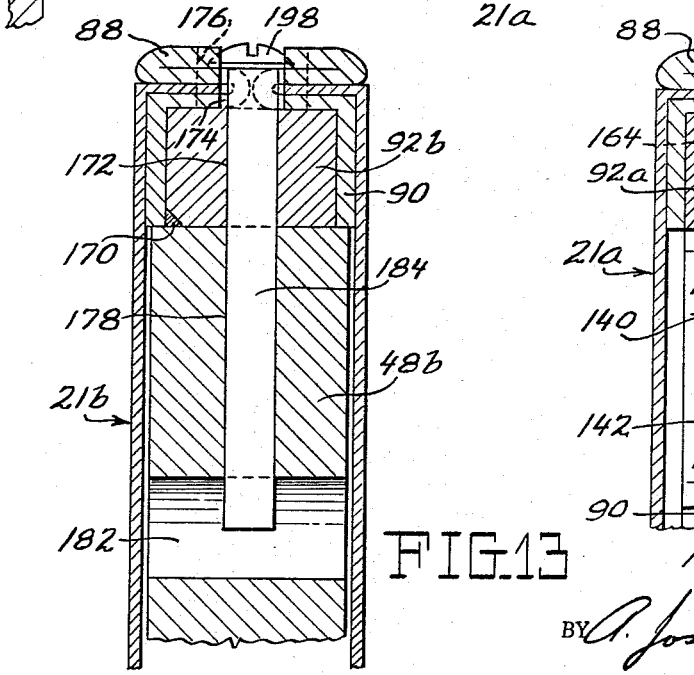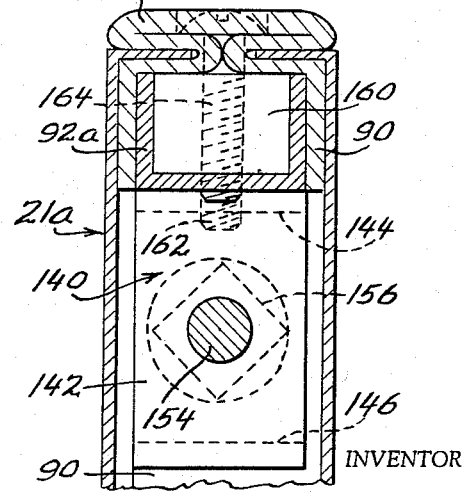

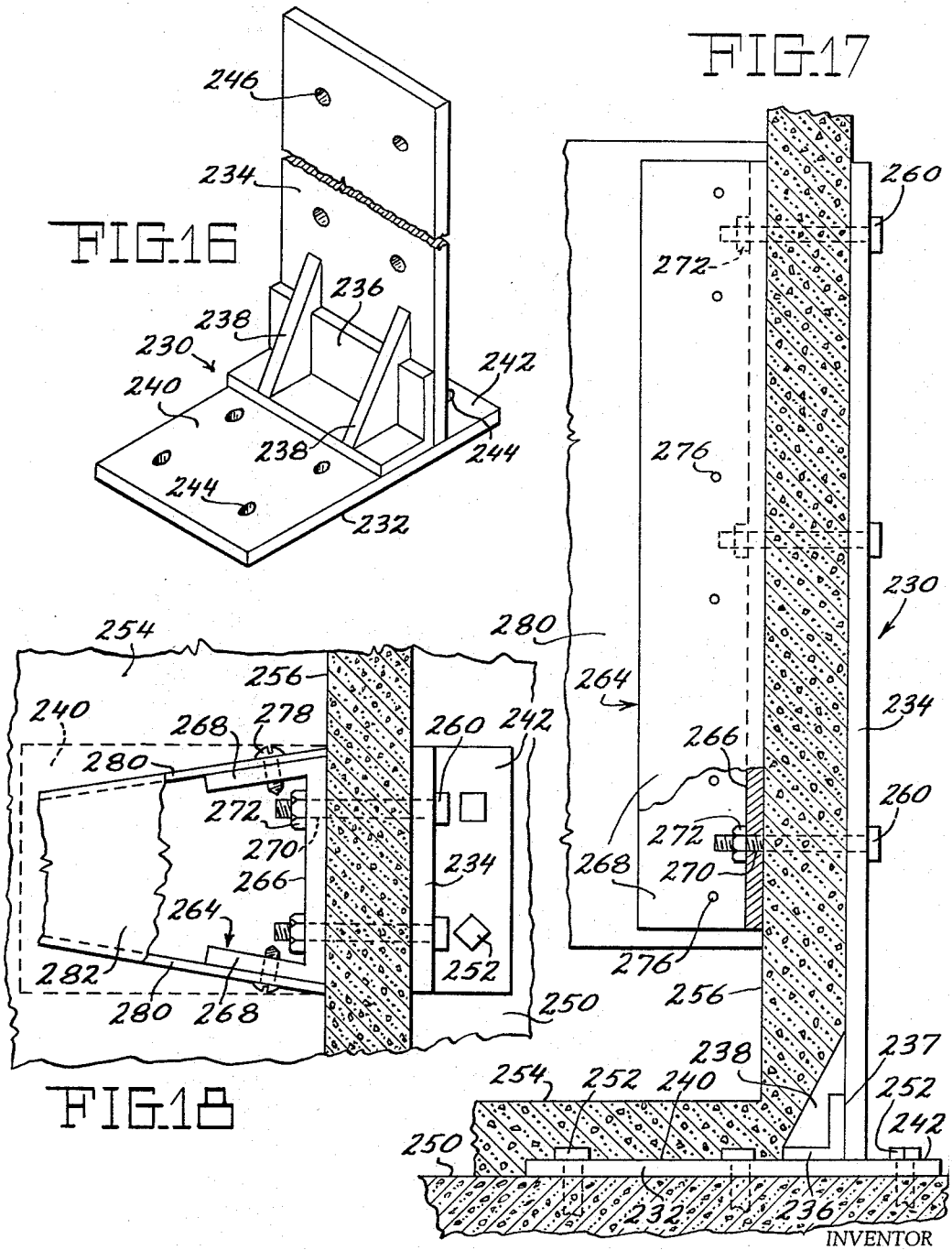

3,283,453
COMBINED FLOOR SUPPORTED AND WALL CONTAINED PEDESTAL STRUCTURE AND CANTILEVER PARTITION ASSEMBLY
Nathan Schooler, % Flush-Metal Partition Corp., 46—10 11th St., Beechhurst, Long Island, N.Y.
Filed Feb. 25, 1964, Ser. No. 350,629
18 Claims. (Cl. 52—73)

This invention relates to toilet compartment partitions and more particularly to a floor supported and wall associated pedestal structure with projecting bracket arms and the mounting thereon and connection thereto of a compartment partition such that the partition is supported as a cantilever.

In my prior Patent No. 2,865,476 dated December 23, 1958 there is disclosed a wall hung cantilever partition which is supported by bracket arms fastened to a vertical structural steel member of the building before the room wall is finished. In such a construction the weight of the partition supported by the bracket arms and all stresses and strains are directly carried by the structural steel member and not by the wall itself.

In other known forms of installations the bracket arms or other supports for a cantilever partition are directly secured as by bolts to an existing wall of a room. It has been found that such an installation oftentimes results in cracking, fracture or collapse of the wall or breaking away of the partition from the wall due to the weight of the cantilever partition and the stresses and strains arising from use of the toilet compartment wherein the partitions are subjected to lateral and vertical impact from a variety of sources.

It is accordingly the principal object of this invention to provide a pre-fabricated steel pedestal structure having a horizontal base and a vertical column, there extending from the column a pair of upper and lower bracket arms for supporting in cantilever fashion a partition, and to which bracket arms the partition is secured whereby the weight of the partition and the stresses and strains will be carried by the pedestal structure and not by the wall.

Another specific object of the invention relates to so constructing the pedestal structure as to have the same placed as a unit and secured in position by bolting of the horizontal base to the sub-floor and the column to the roughed-in-wall, both the sub-floor and roughed-in-wall being provided with pre-formed recesses to respectively accommodate the horizontal base and vertical column such that on completion of the floor and wall, the entire pedestal structure will be concealed with only the bracket arms extending horizontally outwardly from the wall.

Still another object of the invention relates to forming the horizontal base of the pedestal structure such as to have a wide seating area whereby to afford maximum stability and support for the column which rises vertically from the rear side of the base.

A further important object of this invention is to rigidly secure the bracket arms to the column of the pedestal structure and to provide a bracing structure so as to preclude lateral movement of the bracket arms.

It is another object of this invention to construct the bracket arms such as to support a conventional rectangular partition wherein the side panels are parallel, the invention also contemplating the provision of bracket arms designed to support a wedge-shaped partition of the type as shown in my prior patent referred to hereinabove.

A still further object of this invention is the provision of a guiding and support construction forming part of the interior structure of a partition for engagement with the bracket arms whereby to mount the partition thereon there being included in the partition separable fastening devices for securing the same to the bracket arms.

Another object of this invention relates to a stile structure that is provided with upper and lower support bars which extend into the front edge of the partition for seating engagement with the bracket arms or with a fixed support within the partition and to which the support bars are secured.

An additional object of this invention is the provision of coacting interlocking parts between the stile and the front portion of the partition at substantially the vertical center thereof for retaining the central portion of the stile in abutting engagement with the front edge of the partition.

A further object of this invention is the provision of a pedestal structure including a horizontal base for attachment to a sub-floor and a vertical plate arranged to abut one side of a subsequently built-up wall, the vertical plate carrying bolts; and a cantilever partition supporting structure engaging the other side of the wall supported by said bolts and clamped thereby to the wall such that the pedestal structure will support substantially the weight of the partition and take the strains and stresses incident to its use.

From the above stated objects of this invention it will be seen that it is the essential purpose of this invention to provide a unit handled pedestal structure with projecting bracket arms that is of great strength and of simple and inexpensive construction, that is easily and quickly installed during building construction, that will be concealed when the floor and walls are finished leaving only the projecting bracket arms, that the partition with its parts coacting with the bracket arms is readily mounted thereon and secured in place; the entire construction being such as to relieve the wall of stress and strain to thereby preclude any damage thereto.

The invention will be more fully understood, and other objects and advantages thereof will become apparent from a consideration of the detailed description as appearing hereinafter, taken in conjunction with the accompanying drawings forming a part hereof, in which like reference characters designate like parts throughout the several views, and wherein:

FIG. 1 is a perspective view of a single toilet compartment with cantilever partitions.

FIG. 2 is a perspective view of a floor supported and wall contained pedestal and bracket arm structure for a compartment partition.

FIG. 2A is a perspective view showing a modification of the brace structure for the bracket arm.

FIG. 2B is a front elevational view partly in section of the column and brace structure with the bracket arm bolted to the brace structure.

FIG. 3 is a plan view of the pedestal and bracket arm structure in position on a floor and wall.

FIG. 4 is a detail sectional view of the pedestal and bracket arm structure taken on line 4—4, FIG. 3.

FIG. 5 is a vertical sectional view taken on line 5—5, FIG. 1 of a compartment partition with stile, mounted on the bracket arms of the pedestal structure.

FIG. 6 is a detail sectional view taken on line 6—6, FIG. 5 showing one of the partition fastener screws.

FIG. 7 is a perspective view of a stile and its stile support bar.

FIG. 8 is a vertical sectional view of a center fastener connection for the stile.

FIG. 9 is an end elevational view of the center fastener connection of FIG. 8.

3

Figure 15:
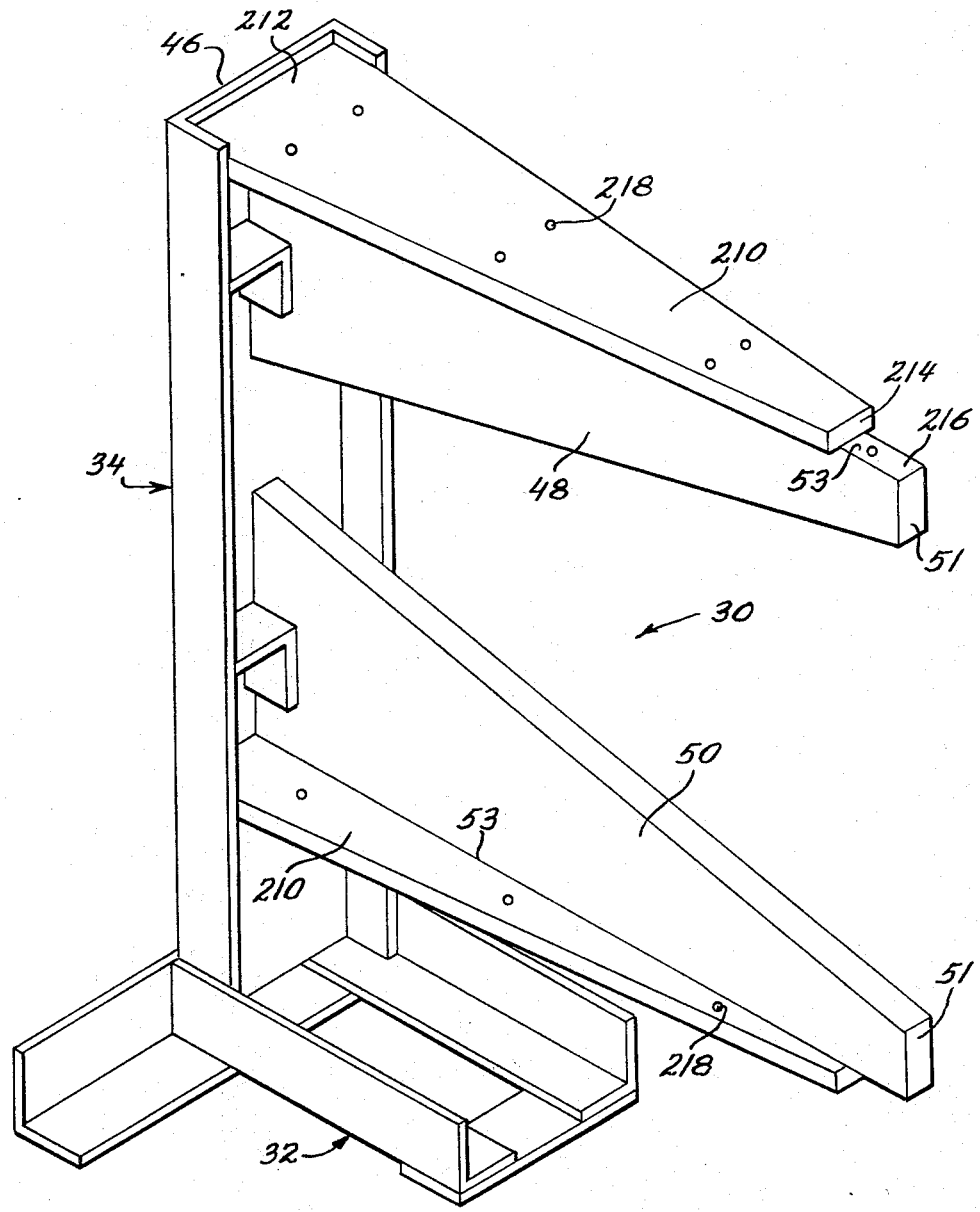

FIG. 10 is a vertical sectional view illustrating one embodiment for mounting and securing a compartment partition to the bracket arms of the pedestal.

FIG. 11 is a detail sectional view taken on line 11—11, FIG. 10.

FIG. 12 is a vertical sectional view illustrating another embodiment for mounting and securing a compartment partition to the bracket arms of the pedestal.

FIG. 13 is a detail sectional view taken on line 13—13, FIG. 12.

FIG. 14 is a perspective view of a wedge as employed in the embodiment of FIG. 12.

FIG. 15 is a perspective view of the pedestal and bracket arm structure of FIG. 2, modified to support a wedge-shaped compartment partition.

FIG. 16 is a perspective view of a modified form of pedestal and bracket structure.

FIG. 17 is a vertical view partly in section of the modified form of pedestal and bracket structure of FIG. 6 as installed.

FIG. 18 is a plan view partly in section of the pedestal and bracket structure of FIG. 1.

Referring now to the drawings, there is shown in FIG. 1 a toilet compartment 20 comprising spaced cantilever partitions 21, 22 extending from a wall 23, with their bottom edges spaced from a floor 24, the compartment 20 being one of a row of such compartments with like partitions as shown in my Patent No. 2,865,476 referred to hereinabove. The partitions 21, 22 are each provided at their forward vertical edge with a stile 25, on one of which is hingedly mounted a swinging door 26. In the embodiment of FIG. 1, the partitions 21, 22 are of rectangular shape with parallel side panels.

The cantilever partitions are each supported by a pedestal structure 30 shown in FIG. 2, having a horizontal base 32 and a vertical column 34. The horizontal base 32 is formed of a rear angle bar 36 and a pair of forwardly extending angle bars 38, 40 suitably welded thereto which seat on the horizontal flange 36a of the rear angle bar 36, with their rear terminal ends abutting the vertical flange 36b. The forwardly extending angle bars 38, 40 are of equal length and are centrally positioned in spaced parallel position on the rear angle bar 36 in the manner shown whereby to provide a horizontally extending stabilizing leg 41, 42 on each side of the angle bars 38, 40. At the forward terminal end of the forwardly extending angle bars 38, 40, there is a cross bar 44 equal in thickness to that of the horizontal flange 36a positioned below the horizontal flanges of the angle bars 38, 40 and secured thereto as by welding.

The column 34 of the pedestal structure 30 is formed of a channel 46. The channel 46 at its lower end is seated directly on the horizontal flanges of the angle bars 38, 40 with the channel flanges engaging the vertical flanges of the angle bars and the back of the channel web engaging the vertical flange 36b of the rear angle bar 36. The channel 46 is vertical with respect to the angle bars 38, 40 and is rigidly secured thereto as well as to the rear angle bar 36 by welding.

Positioned in the vertical medial plane of the channel 46 normal to the web thereof are upper and lower cantilever bracket arms 48, 50 which are secured at their rear edges as by welding to the channel web. The bracket arms 48, 50 are of heavy plate stock and of a thickness such as to fit between the inside faces of the opposed panels making up a partition as will be hereinafter described. Preferably the bracket arms 48, 50 are of the same dimensions, each having parallel front and rear vertical edges 51, 52 with the rear edge 52 of substantially greater length than the front edge 51, a horizontal edge 53 at right angles to the rear edge 52 and an inclined edge 54. The bracket arms 48, 50 are arranged on the channel 46 with their inclined edges 54 in opposed relation and are spaced apart a vertical distance determined by the partition that is to be supported thereby.

4

It will be seen that the top horizontal edge 53 of the upper bracket arm 48 and the lower horizontal edge 53 of the lower bracket arm 50 are parallel and respectively provide support and attaching surfaces for the upper and lower side edge structures of a partition, as shown in FIG. 5, and as will be hereinafter described. The bracket arms 48, 50 are each braced against lateral movement by bracing members 56, 58 arranged one on each side of a bracket arm. The bracing members 56, 58 formed of sections of angle bar stock each have a vertical leg abutting a side face of a bracket arm, the terminal free end of the horizontal leg abutting a side flange of the channel 46 and the inner sides of the bracing members seated against the web thereof as clearly shown in FIG. 2. The bracing members 56, 58 are rigidly secured to the bracket arms and channel parts by welding, thereby providing an exceedingly strong and rigid construction. The horizontal base 32 and the vertical column 34 of the pedestal structure 30 are provided with suitably located openings 60, 61 for the reception of bolts to anchor the base and column, respectively, to a sub-floor and roughed-in-wall as will be hereinafter described. Additional bolt receiving openings may be provided as desired in the horizontal flange 36a of each of the horizontal stabilizing legs 41, 42 to anchor the same to the sub-floor.

It is to be understood that the bracing elements 56, 58 may take a variety of forms and arrangements. Thus, as shown in FIG. 2A there is provided two pairs of upper and lower bracing elements 64, 65 for each bracket arm; the bracing elements being sections of angle bar stock and disposed with their legs vertical and abutting the side faces of the bracket arm and the flanges of the channel 46, all being rigidly secured together by welding. In some instances, see FIG. 2B, the bracing elements shown in upper and lower pairs 56a, 58a are not welded to the bracket arms so that the bracket arms may be inserted between the bracing elements and bolted thereto as at 66, 67 when the pedestal structure is installed in position. This may be desirable where a smaller and/or lighter weight partition is utilized or for storage and transport purposes. In other cases, instead of bolting the bracket arms to the bracing elements, the same may be welded thereto and to the channel after the pedestal structure is installed in position.

It is apparent from the above described construction of the pedestal structure 30 that the same has great strength and stability. The horizontal base 32 and its relationship to the vertical column 34 will act to prevent lateral as well as forward tilting, and will of itself directly support and carry the cantilever partition as well as absorbing all stresses and strains incident to its use.

Referring now to FIGS. 3 and 4, the pedestal structure 30 is shown installed in place. A rough or sub-floor 68 is in its construction formed with a horizontal recess 70 to accommodate the horizontal base 32, and the roughed-in-wall 72 is in its construction formed with a vertical recess 74 to accommodate the vertical column 34. The rear of recess 70 adjacent the roughed-in-wall 72 and forwardly thereof is widened as at 75, 76 to permit placement within the recess of the lateral legs 41, 42 of the rear angle bar 36 of the horizontal base, the widened recess portions 75, 76 extending into the roughed-in-wall 72. The vertical wall recess 74 is of course of a width to accommodate the column 34. Thus, the horizontal base 32 is first seated in the recess 70, 75, and 76 and then moved back so that the column 34 is positioned within the vertical recess 74. When so placed, the pedestal structure is secured in position by the bolts 78, 79. It is to be understood that the depth of recess 70 for each pedestal structure is such as to insure that for all the pedestal structures placed in position to provide a row of toilet compartments, all the bottom edges 53 of lower bracket arms 50 will lie in the same horizontal plane and at the proper predetermined distance "X," see FIG. 4, from the finished floor surface 78. To insure this horizontal alignment of the bracket arms 50 and proper leveling of the pedestal structures proper shimming of the same may be resorted to in the manner well known. After placement and attachment of the pedestal structures 30, the recesses in the sub-floor and roughed-in wall are filled preparatory to applying the finish floor 78 and the finish wall 80. As will be apparent the pedestal structure 30 will be wholly concealed and only the upper and lower bracket arms 48, 50 will project cantilever fashion from the wall.

The bracket arms 48 and 50 projecting outwardly from the finish wall 80 support the cantilever compartment partition 21, see FIG. 5. As indicated heretofore the partition 21 is of rectangular formation having parallel sheet metal side panels 84, 86, see FIG. 6. Such a partition as manufactured by me has its side panels 84, 86 joined along their edges by an edging construction 88 which includes an interior channel shaped reinforcement 90 welded to the side panels that provides great strength and rigidity to the partition. Provided within the channel 90 of the upper and lower edges of the partition is a filler bar 92 that may be of wood or metal and is slid into place through the bracket arm receiving openings 94, 95 provided in the rear edge of the partition. In the embodiment shown in FIG. 5, the bracket arms 48, 50 are substantially the full horizontal length of the partition. The filler bars 92 at their forward ends terminate short of the front edge of the partition for a purpose to be hereinafter described and the rear ends thereof terminate at the rear edge of the partition. As thus constructed the partition 21 is slid onto the bracket arms 48, 50 which enter the partition through the openings 94, 95, and is properly mounted when the partition rear edge abuts the finish wall 80. Screws 98 extend downwardly through openings 100, 102 in the edging construction 88 and filler bar 92, respectively, for threaded engagement within the threaded opening 104 provided in the bracket arm, see FIG. 6, for securing the partition to the bracket arm. It is to be noted that the filler bars 92 engage the horizontal sides 53 of the upper and lower bracket arms 48, 50, and viewing FIG. 6 it will be seen that the thickness or width of the bracket arms is substantially equal to the inside width of the partition between the inside opposed faces of the side panels 84, 86.

In view of the very rugged nature of the bracket arms 48, 50 and their rigid mounting on the column 34 of the pedestal structure 30 as described hereinabove, the described simple placement and attachment of the partition 21 on the bracket arms will provide for an extremely strong and rigid cantilever mounting for the partition with no strain or stress on the wall proper.

As shown in FIG. 1, a stile 25 is mounted on the front edge of each cantilever portion. Referring to FIGS. 5 and 7, it will be seen that the stile 25, which is an elongated narrow rectangular panel, is provided at its top and bottom with rearwardly projecting support bars 108, 110 that are each rigidly secured to a frame structure interiorly of the stile, in a manner not shown. The support bars 108, 110 are dimensioned to correspond with the cross-sectional dimensions of the filler bar 92 and are of a length such as to seat on the forward exposed edge portion of each bracket arm horizontal edge 53 as provided for by the filler bar 92 terminating short of the forward end of the bracket arm. In attaching the stile, the support bars 108, 110 each extend through an opening provided in the edging construction at the front edge of the partition, and screws 112 secure the support bars directly to the bracket arms in the manner shown.

To preclude the occurrence of a gap between the center portion of the stile 25 and the front edge of the partition 21 as might sometimes occur when fastening down the support bars 108, 110 on the bracket arms, or for any other reason, there is provided a center fastening connection 116, as shown in detail in FIGS. 8 and 9. Suitably rigidly secured to the frame structure 118 within the stile 25, at the center thereof is a prong 120 that projects rearwardly from the stile in the same manner as the support bars 108, 110. The prong 120 is generally square in cross-section with serrations 122 provided in its upper and lower sides adjacent its free terminal end which has a double bevel as at 124. Formed in the partition front edge is an opening 126 positioned to permit insertion of the prong 120. A plate 128 having a central opening 130 in registry with opening 126 is positioned within channel 90 and is secured as by welding to the inside wall of the edging construction 88. The plate 128 integrally carries a pair of right angle opposed latch arms 132 which in their normal undistorted position are shown in dotted lines, see FIG. 8. When placing the stile 25 for mounting on the partition 21 and its bracket arms, the prong 120 enters openings 126, 130 and passes between the latch arms 132 deflecting the same inwardly with the terminal ends of the latch arms tightly engaging the serrations 122. With the stile support bars 108, 110 secured by screws 112 and the back face of the stile abutting the forward edge of the partition, the latch arms 132 in their engagement with the prong 120 will act to tightly maintain the center portion of the stile against the partition edge.

The embodiment of FIGS. 10 and 11 has the partition 21a mounted on bracket arms 48a, 50a which are of shorter length than the bracket arms 48, 50. Due to the extreme rigidity of the partition by virtue of its construction a shorter pair of bracket arms for the pedestal structure may in many cases be employed and which bracket arms may be at least one-half to two-thirds the horizontal length of the partition. In the embodiment of FIGS. 10 and 11, the filler bars are inverted channel members 92a, see FIG. 11, which are placed in the upper and lower edging channels 90 in the same manner as the filler bars 92, and also terminate short of the forward edge of the partition, see FIG. 10. The upper end portion of the forward edge of the partition is cut away as at 138 to provide an opening for a C-shaped support bracket 140 having an inner vertical wall 142 and upper and lower horizontal walls 144, 146. The support bracket 140 is positioned within channel 90 and is rigidly secured therein preferably by welding, the support bracket being so positioned that the top surface of upper wall 144 will lie in the same horizontal plane with the top horizontal edge 53 of the bracket arm 48a. Similarly, a like support bracket 140 (not shown) is provided at the lower end of the forward edge of the partition. The horizontal walls 144 of the support brackets 140 serve to support the stile support bars 108, 110 as will be hereinafter described.

Provided in each of the bracket arms 48a, 50a is a horizontal threaded opening 150 having a flared entrance 152 at the forward end 51 of the bracket. The partition 21a is mounted on the bracket arms 48a, 50a, by sliding the same thereover, the bracket arms extending into the partition through the openings 94, 95 in the rear vertical edge of the partition in a manner similar to that described with reference to the embodiment shown in FIG. 5. A rod 154 having a bolt head 156 at one end and its other end threaded as at 158 is inserted through an opening 159 in the inner wall 142 of the support bracket 140, the threaded end 158 being guided into the threaded opening 150 by the flared entrance 152, threaded movement of the rod 154 into the threaded opening 150 of the bracket arm 48a with the head 156 engaging the inner wall 142 will pull the partition 21a rearwardly on the bracket arms until the rear edge of the partition tightly engages the finish wall 80. As will be seen, the rod 154 bridges the space between bracket arm end 51 and the forward edge of the partition. It is to be understood that a similar threaded rod 154 extends through the lower support bracket 140 for engagement with the lower bracket arm 50a. In view of the engagement of the filler bars 92a with the horizontal edge 53 of the bracket arms 48a, 50a there can be no up and down movement of the partition thereon, and due to the width or thickness of the bracket arms there can be no lateral movement of the partition with respect to the bracket arms. Accordingly the two threaded rods 154 will adequately serve to secure the partition on the bracket arms.

The stile 25 is mounted on the forward edge of the partition by insertion of the upper and lower support bars (only the upper support bar 160 being shown, see FIG. 10) into the openings provided between the wall 144 of the support bracket 140 and the channel edging 90, in the manner as clearly shown. A screw 162 secures the support bar 160 to the edging construction 88 of the partition and to the wall 144 of support bracket 140. An additional screw 164 may be provided at the end of the support bar 160 and secures the same to the edging construction 88. If desired the center portion of the stile 25 may be connected to the partition by a center fastener connection such as 116 described above with reference to the embodiment of FIG. 5.

In FIGS. 12, 13 and 14 there is shown another embodiment for securing a partition 21b to the bracket arms of a pedestal structure. Here the filler bar 92b is a solid metal bar fitted within the channel 90 of the edging construction 88 and welded thereto in any suitable manner as at 170, see FIG. 13. Provided in the filler bar 92b adjacent its rear terminal end is a rectangular slot 172. Also provided in the edging construction 88 of the top horizontal edge of the partition 21b is an elongated slot 174 which is enlarged at its forward end as at 176, the slot 174 lying in registry with the slot 172 when the partition 21b is mounted on the bracket arms. The bracket arm 48b is provided with a vertical slot 178 having the side 180 thereof farthest removed from the finish wall 80 inclined, the lower end of the slot opening into a transverse opening 182. With the partition 21b mounted in position the slots 174, 172 and 178 will be in vertical registry. The slots 172 and 178 have the same transverse width to snugly receive a wedge member 184. The wedge member 184 has a front vertical edge 186 and a rear inclined edge 188 which edges may be either flat or rounded. The rear side 173 of the slot 172 is vertical and is correspondingly either flat or rounded. At the upper end the wedge member is provided with a rearwardly extending ear 190 having a central elongated screw receiving opening 192 therein. Provided in the filler bar 92b forwardly of the slot 172 is an elongated screw receiving opening 194, and extending downwardly from the horizontal edge 53 of the bracket bar 48b is a threaded screw receiving opening 196. It is to be understood that a like slot and wedge construction is provided on the lower bracket arm (not shown) and the bottom edge construction of the partition 21b.

With the partition 21b mounted on the bracket arms, the insertion of the wedge members 184 into their respective slots with the vertical side 186 of the wedge member 184 in contact with the vertical side 173 of slot 172 in the filler bar 92b and the inclined side 188 of the wedge member engaging the inclined side of slot 178 in the bracket arm, and the driving of the same into the bracket arms, will cause the partition 21b to move rearwardly into tight engagement with the finish wall 80, it being understood that the wedge member ear 190 will seat within the enlarged end opening 176 of the slot 174 in the edging construction 88. A screw 198 inserted through openings 192, 194 and threadedly engaging opening 196 serves to anchor the driven wedge member in place, it being contemplated that the ear 190 will seat on the top surface of the filler bar 92b. To preclude the screw 198 from coming loose, a suitable lock washer 200 is employed. It is thus seen that the wedge members 184 with locking screws 198 adequately serve to secure the partition 21b on the bracket arms, no other fastening means being required. The stile 25 (with or without the center fastener connection 116) may be mounted on the partition 21b in the manner as shown either in FIG. 5 or FIG. 10 depending on the horizontal length of the bracket arms.

Where it is desired for the bracket arms of a pedestal structure to support a cantilever wedge shaped partition of the type as shown in my prior Patent No. 2,865,476 above referred to, the same pedestal structure 30, see FIG. 2, may be modified to accomplish this purpose by securing to each horizontal edge 53 of the bracket arms 48, 50 a substantially triangular support plate 210, see FIG. 15. The rear end 212 of each support plate 210 is shaped so as to closely fit between the flanges of the channel 46 and to abut the web thereof, and the support plate may be welded directly to its associated bracket arm as well as to the channel web and flanges, thus, in effect, providing additional bracing to its associated bracket arm. The front end 214 of each support plate terminates short of the terminal end 51 of the bracket arm to provide a supporting ledge 216 for the stile support bars 108, 110 in the manner as shown in FIG. 5. Screw receiving openings 218 are suitably provided in the support plates 210 to receive the fastening screws for attaching the frame of the wedge-shaped partition (not shown) to the bracket arms.

It is to be understood that the bracket arms 48, 50 with attached triangular plates 210, FIG. 15, may be of reduced length such as 48a, 50a of FIG. 10 and the attached triangular plates 210 would be correspondingly shortened to be thus of trapezoidal shape. In such a case the stile support bar, support bracket and threaded rod construction of FIG. 10 may be utilized with the wedge-shaped partition in the manner as described hereinabove.

A different embodiment of pedestal structure is shown in FIGS. 16, 17 and 18. In this embodiment, the pedestal structure 230 constitutes a horizontal rectangular base plate 232 of heavy plate stock of substantial thickness and a vertical rectangular support plate 234 of the same plate stock and thickness. Provided on the base plate 232 is a transverse angle bar 236 suitably welded thereto and located adjacent the rear end thereof. The vertical support plate 234 at its lower end portion is in abutting engagement with the rear face 237 of the vertical leg of the angle bar 236 and with its bottom edge seated on the base plate. The vertical support plate is suitably welded both to the angle bar 236 and to the base plate 232 to provide a rigid integral unit. To further reinforce and brace the vertical plate 234 against forward flexure with reference to the base plate 232, a pair of buttress-plates 238 are welded to the base plate, the vertical support plate, and to the legs of the angle bar 236, as shown in FIGS. 16 and 17. The base plate 232 provides a long leg portion 240 forwardly of the vertical support plate 234, and a short leg portion 242 rearwardly of the vertical support plate. Provided in the base plate front and rear legs 240, 242 are bolt receiving openings 244, there being similar bolt receiving openings 246 provided in vertical rows in the support plate 234.

In its installation, the pedestal structure 230 is placed in position and bolted to the sub-floor 250 by the bolts 252 which anchor the base plate 232 thereto. With the desired row of such pedestal structures as might make up the desired number of toilet compartments secured in place, the finish floor 254 and finish wall 256 is constructed on and around the pedestal structures. Preferably prior to the wall 256 construction, there may be inserted through openings 246 of the vertical support plate 234 the bracket anchor bolts 260, this in order to avoid drilling holes in the wall for the passage of said bolts.

To be mounted on the anchor bolts 260 for attachment to the wall 256 is a cantilever partition carrying bracket structure which may be of any desired type or construction. For purposes of illustration, FIGS. 17 and 18 show a channel shaped bracket structure 264 having a back plate 266 and forwardly inclined side arms 268. The back plate 266 is provided with vertical rows of bolt receiving openings 270 corresponding to the openings 246 in the vertical support plate 234. Thus, with the back plate 266 of the bracket 264 mounted on the projecting ends of the anchor bolts 260, see FIG. 17, the same is securely clamped to the wall 256 by setting up on the nuts 272 threaded on the anchor bolts 260. Provided in each of the bracket side arms 268 is a vertical row of screw receiving openings 276 for the reception of screws 278 which secure the side panels 280 of a wedge-shaped cantilever partition 282 to said bracket side arms, see FIG. 18.

From the construction and installation of the pedestal structure 230, it will be seen that the same is exceedingly simple, easily fabricated and of great strength and rigidity; and will support a heavy cantilever partition to thereby relieve the wall of stresses and strain that would tend to fracture or damage the wall and which obviates any possibility of the cantilever partition pulling away from the wall.

While the pedestal structure 30, FIG. 2 and FIG. 5, has been shown with like upper and lower bracket arms for carrying a cantilever partition, there may be occasions where only the upper bracket arm may be provided to support the partition and the lower rear corner end of the partition may then be secured, as for example, to a short support bar rigidly connected to and projecting from the column similar to the stile support bar 110, see FIG. 5. In other instances it may be desirable to have the upper bracket arm "long" as 48 in FIG. 5 and the lower bracket arm "short" as 48a, 50a in FIG. 10 and utilizing for the upper "long" bracket arm the stile support bar connection of FIG. 5 and for the lower "short" bracket arm the stile support bar connection of FIG. 10, with or without the threaded rod 154, in which latter case (without threaded rod 154) the lower rear edge of the partition may be secured to the lower "short" bracket arm by a screw fastener such as 98, see FIG. 5.

While several embodiments of the invention have been specifically shown and described herein, it will be apparent to those skilled in the art that various changes and modifications in the details of construction, arrangement of parts and general application of the invention may be made without departing from the spirit and scope of the invention, as set forth in the appended claims.

What is claimed is:

1. A pedestal structure for installation in a floor and wall prior to forming the finish floor and finish wall to support a cantilever partition comprising:
   (a) a horizontal base,
   (b) a vertical column having a wall engaging surface extending upwardly from one end portion of said base,
   (c) a pair of bracket arms, on which said cantilever partition is mounted, connected to said column, projecting horizontally forwardly thereof and overhanging said horizontal base, at least said base and column being integrally connected together to form a unit handled structure,
   (d) said pair of bracket arms each comprising an elongated plate member arranged vertically one above the other and secured at their rear ends to said column and normal thereto,
   (e) each bracket arm plate member having a straight horizontal supporting surface with the horizontal supporting surface of the upper bracket arm uppermost and the horizontal supporting surface of the lower arm lowermost whereby to be engaged respectively by the upper and lower inner horizontal edge portions of a partition,
   (f) lateral bracing means on each side of each bracket arm connected to said bracket arms and to said column, and
   (g) a horizontal stabilizing leg extending laterally from each side of said horizontal base and in transverse alignment with said column.

2. A pedestal structure for installation in a floor and association with a wall rising therefrom to support a cantilever partition comprising:
   (a) a horizontal base,
   (b) a vertical column member having a wall engaging surface extending upwardly from said base adjacent the rear end thereof to provide a front base leg and a rear base leg and said base and column member being rigidly connected together for installation as a unit,
   (c) bracing means between said base and the lower end portion of said column member,
   (d) openings in the front and rear legs of said base for fastener elements to attach said base to a sub-floor prior to construction of the finish floor to encase said base,
   (e) anchor means on said column member extending through a built-up wall having one side thereof in engagement with said column wall engaging surface, and
   (f) bracket means on which said cantilever partition is mounted including a backing plate engaging the other side of said wall, mounted on said anchor means and secured in position thereby relative to said wall and to said column, said bracket means overhanging said front leg of said base.

3. A pedestal structure for installation in a floor and wall prior to forming the finish floor and finish wall to support a cantilever partition comprising:
   (a) a horizontal base comprising,
      (1) a rear transverse horizontal angle bar in L-position,
      (2) a pair of longitudinal parallel angle bars arranged in opposed L-position seated centrally on the horizontal leg of the rear angle bar with their terminal rear ends abutting the vertical leg thereof,
      (3) a transverse cross-bar beneath the horizontal legs of the opposed parallel angle bars at the forward terminal ends thereof,
      (4) said angle bars and cross-bar being rigidly connected together, and
      (5) the rear angle bar portion extending laterally beyond each side of said parallel angle bars providing a stabilizing leg;
   (b) a vertical column comprising a channel member having its lower end seated on the horizontal legs of the parallel angle bars, with the flanges of the channel member engaging the vertical legs of the parallel angle bars and the web of the channel member contacting the vertical leg of the rear transverse angle bar, said engaging parts of said channel member and angle bars being rigidly connected together,
   (c) upper and lower pairs of horizontally aligned bracing elements arranged between the flanges of the channel member and rigidly secured thereto and to the web of said channel member,
   (d) the bracing element of each pair having a vertical portion arranged in opposed equal spaced relation to the vertical medial plane of said channel member,
   (e) a bracket arm having its rear portion positioned in the space between the spaced vertical portions of each pair of bracing elements and its rear edge abutting the web of said vertical channel member, and
   (f) means rigidly securing each said bracket arm to its associated bracing elements and to said channel web, whereby said bracket arms will lie in the same vertical plane and overhang said horizontal base.

4. The pedestal structure of claim 3, wherein:
   (a) each said bracket arm is formed of heavy plate stock having a uniform thickness and having a straight horizontal edge normal to its rear edge, with the horizontal edge of the upper bracket arm uppermost and the horizontal edge of the lower bracket arm lowermost, (b) said bracket arms being adapted to telescope within a partition having parallel side panels and the upper and lower horizontal edges of the bracket arms providing supporting and attaching surfaces respectively, for the upper and lower horizontal edges of the partition.

5. The pedestal structure of claim 3, wherein:
(a) each said bracket arm is formed of heavy plate stock having a straight horizontal edge normal to its rear edge, with the horizontal edge of the upper bracket arm uppermost and the horizontal edge of the lower bracket arm lowermost,
(b) a substantially triangular plate member symmetrically seated on the horizontal edge of each bracket arm and rigidly secured thereto,
(c) The base portion of each triangular plate being positioned within said channel member and secured thereto whereby to provide additional bracing structure for said bracket arms,
(d) said bracket arms with attached triangular plate members being adapted to telescope within a partition having inclined side panels and the upper and lower triangular plate members providing supporting and attaching surfaces, respectively, for the upper and lower horizontal sides of the partition.

6. A cantilever partition assembly comprising:
(a) a pedestal structure unit for installation in a floor and wall prior to forming the finish floor and finish wall comprising,
  (1) a horizontal base,
  (2) a vertical column on said base at the rear end thereof,
  (3) a horizontal stabilizing angle bar extending laterally from each side of said horizontal base at the rear end thereof and co-extensive with the lateral extent of said column,
  (4) a pair of upper and lower bracket arms secured in vertical alignment to said column and normal thereto, said bracket arms overhanging said horizontal base,
  (5) lateral bracing elements connected to each bracket arm and to said column,
(b) the upper bracket arm having an upper horizontal supporting surface and the lower bracket arm having a lower horizontal supporting surface;
(c) a partition having top and bottom sides, a rear side and a front side, comprising,
  (1) side panels, and
  (2) horizontal supporting means for the top and bottom sides interiorly of said partition,
(d) upper and lower openings in the rear side of said partition respectively receiving therethrough said upper and lower bracket arms which extend completely into said partition when said rear side engages the finish wall,
(e) the upper and lower horizontal supporting surfaces of the upper and lower bracket arms respectively engaging the horizontal supporting means of the partition top and bottom sides, and
(f) fastening means for securing said partition to each said bracket arm.

7. The cantilever partition assembly of claim 6, including
(a) a stile,
(b) a support bar at the upper and lower ends of said stile projecting rearwardly from the inside face of said stile,
(c) top and bottom openings in the front side of said partition,
(d) said support bars extending respectively through said top and bottom openings in said front side, with each support bar seated on a terminal forward end portion of one of said bracket arms and with the inside face of the stile abutting the front side of said partition, and
(e) fastening means securing each support bar to its associated bracket arm.

8. The cantilever partition assembly of claim 7, including
(a) a center self-interlocking fastener connection including a pair of coacting fastener elements each fixedly carried respectively by said stile and the front side of said partition vertically centrally thereof.

9. The cantilever partition assembly of claim 8, wherein said pair of coacting fastener elements of said center fastener connection comprises, and
(a) a prong secured to said stile and projecting rearwardly from the inside face thereof,
(b) serrations on the free end portion of said prong,
(c) there being an opening in the front side of said partition for receiving said prong,
(d) at least one latch arm positioned interiorly of the partition adjacent said opening for coaction with said prong, whereby upon insertion of said prong into the opening of said partition said latch arm will engage the serrations thereon to hold the center portion of said stile tight against the front side of said partition.

10. The cantilever partition assembly of claim 6, wherein
(a) said fastening means comprises at least one fastener element for each of the top and bottom sides of the partition respectively extending therethrough and through the corresponding horizontal supporting means and bracket arms.

11. The cantilever partition assembly of claim 10, wherein
(a) each said fastener element is a wedge,
(b) a wedge receiving opening in the top and bottom sides of said partition,
(c) coacting wedge slots in said supporting means and bracket arms in registry with its associated wedge receiving opening and receiving said wedge,
(d) each said wedge operating in its coacting wedge slots to draw the partition tight against the finish wall, as well as to secure the partition to said bracket arms, and
(e) means securing said wedge to its associated bracket arm to prevent disengagement thereof.

12. The cantilever partition assembly of claim 6, wherein
(a) the length of said bracket arms is substantially less than the horizontal length of the partition,
(b) there being an elongated opening at the upper and lower end portions of the front side of said partition,
(c) upper and lower support brackets within said partition and secured thereto, each bracket being positioned opposite an elongated opening and having a vertical wall facing its associated elongated opening and a horizontal wall vertically spaced respectively from an adjacent top and bottom side of said partition to provide a seat for a stile support bar,
(f) a rod receiving opening in each said vertical wall,
(g) a threaded opening in each said bracket arm to register with said rod receiving opening,
(h) said fastener means comprising a fastener rod for each support bracket having a bolt head at one end to engage the vertical wall and being threaded at its other end,
(i) each said rod extending through a rod receiving opening of a vertical wall and threadedly engaging the registering bracket arm threaded opening whereby to draw the partition tight against the finsh wall, as well as to secure the partition to the bracket arms.

13. The cantilever partition assembly of claim 12, including
(a) a stile,
(b) a support bar at the upper and lower ends of said stile projecting rearwardly from the inside face of said stile, (c) each support bar extending through the front side of the partition respectively between the top and bottom sides of the partition and a support bracket horizontal wall vertically spaced therefrom and in seating engagement therewith, and (d) fastening means securing each stile support bar to its associated support bracket horizontal wall, whereby to secure the stile in abutting engagement with the front side of said partition.

14. The cantilever partition assembly of claim 6, wherein:

(a) said top and bottom sides of said partition include an edging construction connecting said side panels along the top and bottom edges of said partition, and (b) said horizontal supporting means comprising a filler support positioned within the top and bottom edging construction whereby each filler support has seating engagement respectively with said upper and lower horizontal supporting surfaces of the upper and lower bracket arms.

15. The cantilever partition assembly of claim 14, including:

(a) a stile, (b) mounting means at the upper and lower ends of said stile projecting rearwardly from the inside face of said stile, (c) top and bottom openings in the front edge of said partition, (d) said mounting means extending respectively through said top and bottom openings in said front edge with each mounting means engaging a forward terminal end portion of a bracket arm, and (e) fastening means securing each mounting means to its associated bracket arm.

16. The cantilever partition assembly of claim 6, wherein:

(a) said top and bottom sides of said partition each include an edging construction having an inner channel member connecting said side panels along the top and bottom edges of said partition, and (b) said horizontal supporting means comprising a filler support positioned within each channel member for seating engagement respectively with said upper and lower horizontal supporting surfaces of the upper and lower bracket arms.

17. The cantilever partition assembly of claim 16, wherein:

(a) each filler support is of less length than the length of the horizontal supporting surface of its associated bracket arm to provide a free terminal forward end portion thereon, (b) a stile, (c) mounting means at the upper and lower ends of said stile projecting rearwardly from the inside face of said stile, (d) top and bottom openings in the front edge of said partition, (e) said mounting means extending respectively through said top and bottom openings in said front edge with each mounting means seated on a free terminal forward end portion of a horizontal supporting surface, and (f) fastening means securing each mounting means to its associated bracket arm.

18. A pedestal structure for installation in a floor and wall prior to forming the finish floor and finish wall to support a cantilever partition comprising:

(a) a horizontal base, (b) a column having a vertical wall with its lower end seated on the rear end of said base and secured thereto, (c) at least one bracing flange on said wall extending forwardly therefrom with its lower end seated on said base and secured thereto, (d) a horizontal stabilizing leg extending laterally from each side of said horizontal base in transverse alignment with said column wall and flange, and (e) bracket means on which said cantilever partition is mounted secured to said column wall and projecting forwardly therefrom.

References Cited by the Examiner

UNITED STATES PATENTS 2,865,476   12/1958   Schooler _____ 52—73 X

FOREIGN PATENTS 680,720   10/1952   Great Britain.
101,009   4/1962    Netherlands.

HARRISON R. MOSELEY, *Primary Examiner.*

J. K. BELL, *Assistant Examiner.*